B. M. TAKAHASHI.
LENS SHIELDING ATTACHMENT FOR CAMERAS.
APPLICATION FILED OCT. 10, 1917.
1,262,137.
Patented Apr. 9, 1918.
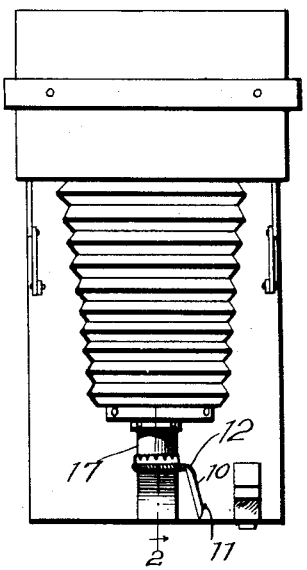
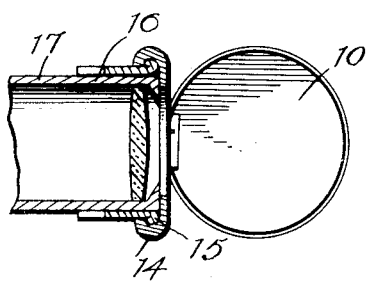
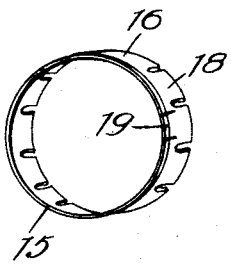
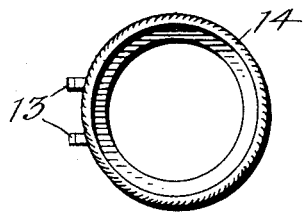
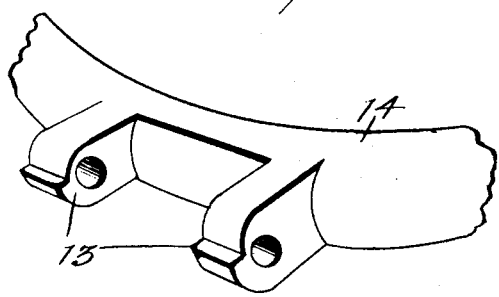
WITNESSES
INVENTOR
BENJAMIN M. TAKAHASHI
BY
ATTORNEYS

UNITED STATES PATENT OFFICE.

BENJAMIN M. TAKAHASHI, OF HARLOWTON, MONTANA.

LENS-SHIELDING ATTACHMENT FOR CAMERAS.

1,262,137.   Specification of Letters Patent.   Patented Apr. 9, 1918.

Application filed October 10, 1917. Serial No. 195,799.

*To all whom it may concern:*

Be it known that I, BENJAMIN M. TAKAHASHI, a subject of the Emperor of Japan, and a resident of Harlowton, in the county of Wheatland and State of Montana, have invented a new and useful Improvement in Lens-Shielding Attachments for Cameras, of which the following is a specification.

My present invention relates generally to cameras, and more particularly to a lens shielding attachment therefor, my object being the provision of a simple readily detachable device of this nature, which in its attached operative position upon the camera may be readily adjusted by the operator so as to shield the lens from light rays in any direction.

In its more specific aspect my invention resides in the features of construction, arrangement, and operation to be now described with respect to the accompanying drawing, forming a part of this specification, and wherein:

Figure 1 is a top plan view of a camera provided with my improvements.

Fig. 2 is a longitudinal section through the lens barrel upon which my improvements are mounted.

Fig. 3 is a detail perspective view of the supporting sleeve of my improvements, removed.

Fig. 4 is a front elevation of the shield carrying ring, removed, and

Fig. 5 is an enlarged detail perspective view of a fragmentary portion of the ring shown in Fig. 4.

Referring now to these figures, my invention contemplates the provision of a readily detachable and instantaneously adjustable lens shield preferably in the form of a circular opaque disk 10, which may have a small projecting stud 11 as seen in Fig. 1, constituting a handle, and which has a projecting leaf 12 at one point, apertured and adapted to extend between projecting apertured studs 13 as seen in Fig. 5, of an adjusting ring 14, to which the shielding disk 10 is immediately attached.

The adjusting ring 14 is U-shaped in cross section, to receive and rotatably seat upon, the annular rib 15 at one end of a supporting sleeve 16, the latter of which is designed to telescopingly engage upon the lens barrel 17 of a camera, and has its opposite end longitudinally slotted to provide an annular series of free extending tongues 18 to facilitate its disposition upon the barrel.

Thus it is obvious that the supporting sleeve 16 may be readily disposed upon and removed from, the barrel 17 of a camera, its operative position being shown in Fig. 2, and it is equally obvious that the adjusting ring 14 is capable of instantaneous adjustment annularly around the sleeve 16, so as to adjust the hinged connection of the shielding disk 10 to that point from which the rays, whose deleterious effect my invention proposes to obviate, emanate.

It is furthermore obvious that when its hinged point is so adjusted, the shielding disk 10 is capable of inclination at various angles with respect to the axis of the attachment, in order to obstruct such rays more or less fully as may be desired or required by the strength of the light.

In view of the fact that frequent manipulation of the adjusting ring 14 will be required in use, and its constant rotation with respect to the supporting sleeve will cause considerable wear, I preferably provide that end of the sleeve 16 extending within the adjusting ring, with longitudinal parallel slits, extending through the rib 15 of the sleeve to form a substantially free tongue 19, capable of being bent slightly in an outward direction so as to increase the frictional contact between the rib and the adjusting ring 14, and thus provide for non-slipping support of the latter in adjusted position at all times.

It is to be observed that by the provision of the adjusting ring 14, movable with respect to the sleeve 16, the latter of which telescopes upon the lens barrel 17, I avoid the necessity of rotating the said sleeve with respect to the lens barrel and consequent scouring and mutilation of the barrel.

My invention may be made in various sizes to fit various types, styles and makes of cameras, and provides for a wide range of choice in materials of which it may be formed.

I claim:

1. A lens shield of the type described, consisting of a sleeve arranged to telescopingly engage a lens barrel and having an annular outstanding rib adjacent one end, an adjusting ring U-shaped in cross section, seated upon and annularly shiftable with respect to, the rib of said sleeve, and a shielding disk, the edge of which is hinged at one point to one side of the said adjusting ring.

2. A lens shield of the type described, consisting of a sleeve arranged to telescopingly engage a lens barrel and having an annular outstanding rib adjacent one end, an adjusting ring U-shaped in cross section, seated upon, and annularly shiftable with respect to, the rib of the said sleeve, and a shielding disk, the edge of which is hinged at one point to one side of the said adjusting ring, said sleeve having parallel slits at one end through its said rib, forming a free tongue bendable outwardly to increase frictional contact between the rib and the adjusting ring.

3. A lens shield of the type described, consisting of a sleeve arranged to telescopingly engage a lens barrel and having an annular outstanding rib adjacent one end, an adjusting ring U-shaped in cross section, seated upon and annularly shiftable with respect to, the rib of said sleeve, and a shielding disk, the edge of which is hinged at one point to one side of the said adjusting ring, said sleeve having its free end longitudinally slotted to form an annular series of longitudinal extensions whereby to facilitate its disposition upon a lens barrel.

4. A lens shielding attachment for lens barrels consisting of a sleeve for telescopic engagement upon a lens barrel, an annularly adjustable ring carried by said sleeve at one end thereof, and a shielding member hinged to the ring and adjustable with respect thereto and movable with the ring in respect to the said sleeve.

BENJAMIN M. TAKAHASHI.

Witnesses:
W. A. LYNN,
R. H. DUMAS.